United States Patent [19]

Dale et al.

[11] Patent Number: 4,999,816

[45] Date of Patent: Mar. 12, 1991

[54] HYDROPHONE DEPLOYMENT SYSTEM FOR A SONOBUOY

[75] Inventors: John R. Dale, Pennsburg; Roger A. Holler, Warminster, both of Pa.

[73] Assignee: The United States of America as represented by the Secretary of the Navy, Washington, D.C.

[21] Appl. No.: 528,506

[22] Filed: Sep. 1, 1983

[51] Int. Cl.[5] .......................... H04B 1/59; B63B 21/52

[52] U.S. Cl. .......................................... 367/4; 367/165; 367/173; 441/33

[58] Field of Search ............................ 367/4, 165, 173; 440/44, 45; 441/21, 22, 24, 33

[56] References Cited

U.S. PATENT DOCUMENTS 2,941,492 6/1960 Wilcoxon .

3,800,271 3/1974 Stillman, Jr. .

3,944,964 3/1976 Loeser et al. ............................ 367/4

4,004,265 1/1977 Woodruff et al. ....................... 367/4

*Primary Examiner*—Thomas H. Tarcza

*Assistant Examiner*—Daniel T. Pihulic

*Attorney, Agent, or Firm*—James V. Tura; James B. Bechtel; Susan E. Verona

[57] ABSTRACT

A sonobuoy is disclosed which has a linear array of hydrophones horizontally depolyable at sea by a metal hydride jet thruster. The thruster is powered by releasing hydrogen gas from iron-titanium hydride ($FeTiH_{1.95}$) and igniting it in a mixture with oxygen generated by reacting sodium peroxide ($Na_2O_2$) with the water. The hydride is activated by an electrical heater and the steam generated by the combustion of the hydrogen and oxygen mixture. The thrust is directionally controlled in azimuth and depth by a compass and depth sensor.

19 Claims, 2 Drawing Sheets

HYDROPHONE DEPLOYMENT SYSTEM FOR A SONOBUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to apparatus for extending a line in a fluid medium, and more particularly to a sonobuoy having hydrophones deployable in a linear array at a selected depth.

Line arrays of hydrophones are particularly useful for localizing the source of acoustic signals at long range because of their ability to listen with improved signal-to-noise ratio along narrow beams transverse to the arrays. It is especially important to maintain the array straight for optimum beam pattern.

Various devices have been used to deploy the line array. In one system, disclosed in U.S. Pat. No. 3,944,964to Loeser et al, the array is stretched between a sea anchor and a surface float. In variable winds and currents, the array many bend, and degrade the beam pattern. In addition, its direction is limited by the directions of the wind and current. Another device, disclosed in U.S. Pat. No. 4,004,265to Woodruff et al, an electric or compressed gas thruster stretches the line array in any desired direction from a sea anchor. The thruster uses an electrical or compressed gas power source with a water or gas jet, or an external propeller. While these thrusters operate independently of the magnitude and direction of wind and currents, they generally have low energy-to-weight ratios which discourage their use in air-launched sonobuoys, such as the Navy's standard A-size. Thrusters having higher energy-to-weight ratios suitable for sonobuoys usually generate noise in a frequency band which interferes with receiving by the hydrophone array.

Accordingly, it is an object of the present invention to provide an improved system for extending a line in a fluid medium. Another object is to provide a sonobuoy with an improved thruster capable of rapid-powered deployment of a linear array of hydrophones and of continuous duty for maintaining linearity over the designed operating life of the sonobuoy. A further object is to provide a thruster for a hydrophone line array which generates low-level noise in a frequency band which does not interfere with the performance of the receiving array of hydrophones. Still another object is to provide an expendable thrust device which is small, relatively inexpensive to manufacture, and which is safe to store, use and maintain.

Briefly, these and other objects of the invention are accomplished by a sonobuoy having a line of hydrophones deployable in the water in a linear array by a metal hydride jet thruster. The thruster is powered by releasing hydrogen gas from a metal hydride material and igniting the gas in a mixture with oxygen to produce an in-water thrust required for extending the array.

For a better understanding of these and other objects and aspects of the invention, reference may be made to the following detailed description wherein:

DESCRIPTION OF THE PREFERRED EMBODIMENTS

Figure 1:
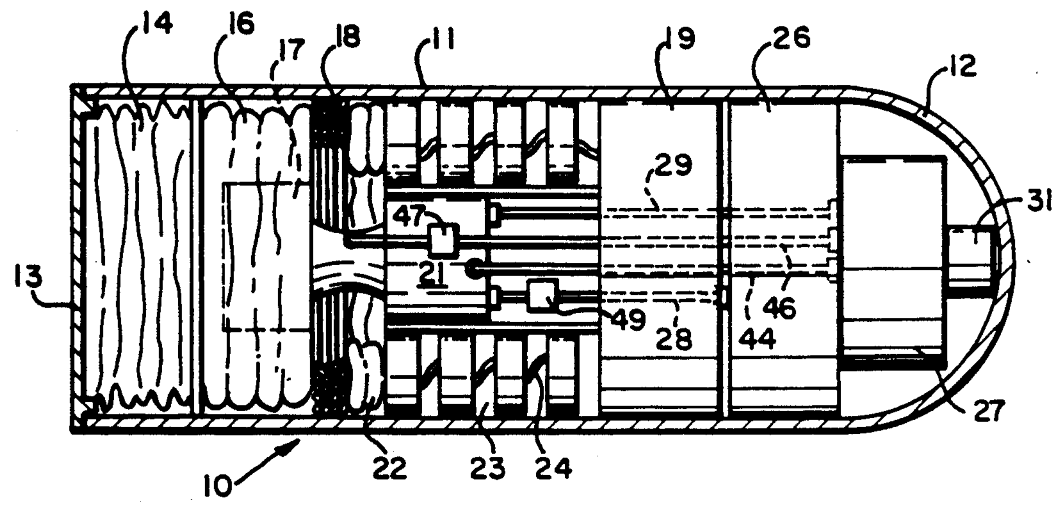
FIG. 1 is a longitudinal cross-section of a sonobuoy assembly including a deployable hydrophone line array according to one embodiment of the invention with the drogue at the free end of the array.

Referring now to the drawings wherein like characters designate like or corresponding parts throughout the several views, there is shown in FIG. 1 a sonobuoy 10 in the prelaunch configuration. The sonobuoy components are housed within a cylindrical casing 11 closed at one end by a streamlined nose portion 12, and closed at the other end by an end cap 13 which is automatically released after launching by conventional means not shown to permit deployment of a parachute or drogue 14 for retarding the descent in air.

Figure 3:
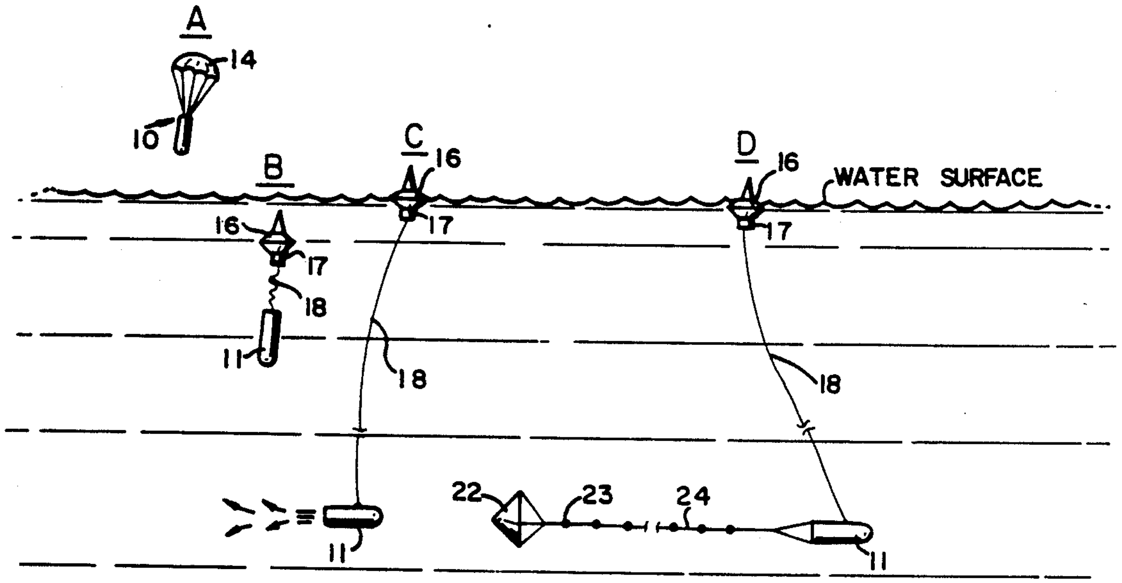
FIG. 3 represents the sonobuoy of FIG. 1 in various stages of deployment.

Upon submerging in water, FIG. 3, the drogue is jettisoned and a float 16 is deployed and inflated for supporting an upper electronics section 17 which includes a transceiver and an extendable antenna of conventional design. A vertical signal cable 18 is electrically connected between the upper electronics unit 17 and a lower electronics unit 19 which lowers with casing 11 as cable 18 pays out to its fully extended length. The deployment of casing 11 to full depth will be rapid due to the weight of its contents.

When the cable 18 completes payout, a reaction motor 21 activates as described herein producing a forward thrust to the casing 11 and deploying a sea anchor 22 and a linear array of hydrophones 23 serially connected by horizontal cable 24 between sea anchor 22 and lower electronics unit 19. The forward end of the casing 11 contains an oxygen generator 26 and a hydrogen generator 27 connected by tubing 28 and 29 for conducting pure oxygen and hydrogen, respectively, to motor 21. A compass 31 within the extreme forward end of the casing 11 controls the direction of thrust from motor 21.

Figure 2:
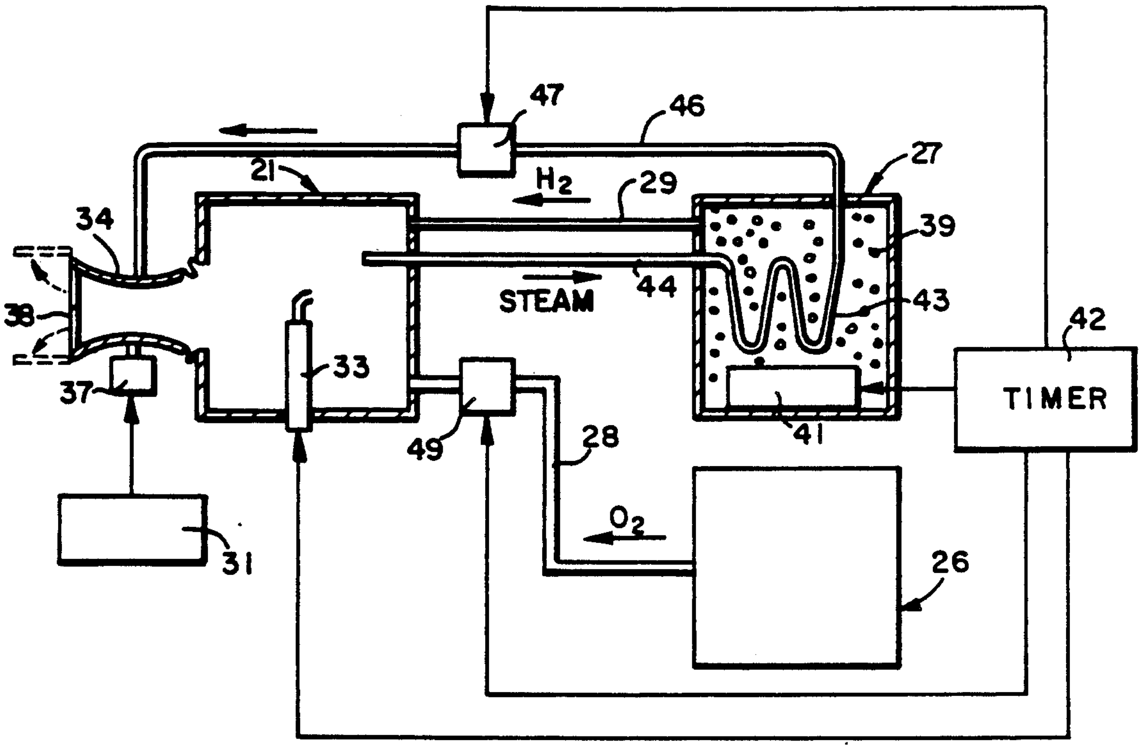
FIG. 2 is a flow diagram for a metal hydride motor as applied in the sonobuoy of FIG. 1.

Referring now to the FIG. 2, reaction motor 21 includes a combustion chamber 32 which receives the oxygen and hydrogen via conduits 28 and 29, respectively. An electrically energized igniter 33 initiates combustion of the hydrogen and oxygen mixture generating thereby high pressure steam which exhausts through a jet nozzle 34 to provide mass thrust as well as a reaction thrust against the high density ambient water. Nozzle 34 is movably connected to chamber 32 by a flexible coupling 36 to permit directional control of the thrust by an azimuth servomotor 37 in response to directional signals from compass 31. By conventional means not shown, it is contemplated the directional signals from compass 31 may be varied from a remote transmitter to change the direction of the array. Also, the depth may be controlled by a pressure-depth sensor and an additional servomotor operating orthogonally to the azimuth servomotor 37. A one-way flapper value 38 at the exit of nozzle 34 is biased in a closed position until the steam pressure within chamber 32 exceeds the ambient water pressure.

The hydrogen for combustion is stored in large amounts in a porous metal hydride bed 39 which release the hydrogen when heated. Iron-titanium hydride ($FeTiH_{1.95}$) has been found particularly suitable because of its high energy storage capacity. Twenty pounds of $FeTiH_{1.95}$ occupies only 0.051cubic feet and will yield $3.7\times10^6$ foot/pounds of work. This is sufficient energy for deploying and towing the hydrophone array over the design life of an "A-side" sonobuoy. For other hydrides of this type, see Riley, J. J. et al., "Hydrogen Storage in Metal Hydrides", *Scientific American*(Feb. 1980), page 118 et seq. Metal hydrides such as calcium hydride ($CaH_2$) can also provide the hydrogen through reaction with ambient water thus making it particularly suitable for sonobuoy applications.

Heat is initially applied in hydride bed 39 by an electrical element 41 actuated by a timer 42 a preset time after air launching. Sufficient lead time is set to insure that the hydride temperature is at a level required to release hydrogen at the high rate needed for deployment of the hydrophone array at the operating depth. The lead time however should be as short as possible to minimize loss of hydrogen through value 38 before ignition. Where the descent rate of the sonobuoy in the air and/or water are predictable, heating element 41 may be energized by a switch operative upon release of the drogue 14 after air launching or upon release of the surface float 16 after water contact.

The heating capability of element 41 after ignition is limited by space and weight limitations of the sonobuoy. Therefore, further heating is augmented by utilizing some of the energy generated in chamber 32. A steam coil 43 receives steam through conduit 44 from a high pressure region of chamber 32 and returns the condensate through conduit 46 to a low pressure region of nozzle 34. A value 47 in conduit 46 responsive to timer 42 sets the steam flow at a high rate for extending the array and at a low rate for maintaining the array linear after it is extended.

Oxygen for completing combustion in chamber 32 is generated in oxygen generator 26 by the reaction of ambient water with a chemical compound, such as sodium peroxide ($Na_2O_2$), after the sonobuoy enters the water. Where conditions allow, compressed oxygen may be used in place of a water-reactive chemical. Oxygen flow is controlled by a value 49 and timer 42 at a high rate during operation of heating element 41 and high flow through steam value 47, and at a low rate during low flow through steam value 47, thus insuring a proportional supply of oxygen for complete combustion of the hydrogen throughout operation of the sonobuoy.

Operation of the sonobuoy 10 according to the above-described embodiment of the invention is summarized with further reference to FIG. 3 showing the sonobuoy in four stages of deployment. Immediately after launching sonobuoy 10 such as from an aircraft, end cap 13 is ejected, drogue 14 deployed, and timer 42 started by conventional means not shown. At the lead time selected to insure a high rate of hydrogen generation at the time vertical cable 18 pays out to the selected operating depth, heater 41 is energized to cause hydrogen pressure to build up in chamber 32. Upon contact with the water, the drogue 14 is jettisoned and surface float 16 inflated. Casing 11 with the remaining contents commences to descend from float 16 paying out vertical signal cable 18. Water pressure acting against flapper value 38 contains the hydrogen within chamber 32 while the pressure continues to build.

When the vertical cable 18 is fully deployed, casing 11 due to its streamlined configuration weathervanes into the direction of towing. After the time allowed for complete payout of the vertical cable 18, weathervaning and hydrogen pressure build-up, timer 42 actuates oxygen value 49 and igniter 33 for initiating combustion in chamber 32. The steam pressure within chamber 32 increases and when it exceeds the ambient water pressure, value 38 opens to develop a thrust which drives the container 11 in the weathervane direction. As it moves forward, sea anchor 22 deploys from the rear with the hydrophones 23 and cable 24 paying out in a linear array.

The steam pressure differential between the chamber 32 and the throat of jet nozzle 34 causes steam to flow through coil 43 to augment heating of metal hydride bed 39 for maintaining the high flow of hydrogen needed for deployment. At a set time after the array is fully deployed, timer 42 causes value 47 to reduce the flow rate to an amount just sufficient to tow the surface float 16 and maintain the array linear. The array is directed in a horizontal plane along a desired azimuth by directional commands from compass 31 to the jet nozzle positioning servomotor 37.

Figure 4:
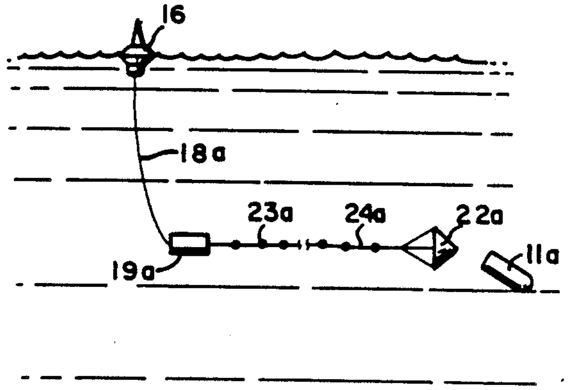
FIG. 4 represents another embodiment of the invention with the drogue and thruster at the free end of the hydrophone array.

FIG. 4 shows another embodiment of the invention in operational deployment where the thrust is used for array deployment only. The drogue (not shown) and surface float 16 are deployed in the manner previously described. A lower electronics unit **19*a* is connected to the float 16 by a vertical signal cable 18*a* which pays out from casing 11*a* as it free falls in the water. The sequence for generating thrust in motor 21 after the cable 18*a* reaches the operating depth is the same as above-described. As the container 11*a* moves horizontally, the drag imparted by unit 19*a*, hydrophones 23*a*and horizontal cable 24*a* reacts against the thrust to deploy the array and sea anchor 22*a*. After the array is fully extended, the container 11*a* separates and falls away. This configuration has a low power advantage since there is no drag of the float 16 and cable 18*a*, and thrust motor 21** is expended after array deployment. However, the array will only align with the direction of the ambient water current.

Figure 5:
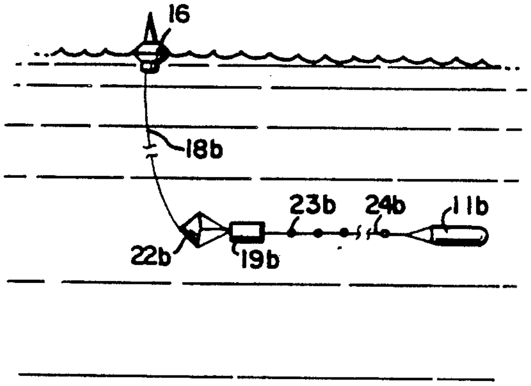
FIG. 5 represents still another embodiment of the invention with the thruster at the free end of the hydrophone array.

FIG. 5 shows still another configuration of the invention in operational deployment wherein the energy required for array deployment is reduced. The drogue (not shown) and surface float 16 are deployed in the manner previously described. A sea anchor **22*b* is connected to the float 16 by a vertical signal cable 18*b* which pays out from casing 11*b* as it free falls in the water. The sequence for generating thrust in motor 21 after cable 18*b* reaches the operating depth in the same as described above. As container 11*b* moves horizontally, the drag imparted by sea anchor 22*b*, lower electronics unit 19*b*, hydrophones 23*b* and horizontal cable 24*b* reacts against the thrust to deploy the array. The container 11*b*** remains attached to the distal end of the array to provide directional control in the manner previously described. This configuration also has a lower power advantage because only the array and sea anchor drag react to the thrust and not the drag of the surface float and vertical cable.

Some of the many advantages of the invention should now be readily apparent from the foregoing description of the preferred embodiments. For example, a high energy-to-weight ratio is obtained using a metal hydride motor compared to a battery-operated motor allowing it to be packaged in a standard Navy "A-size" sonobuoy. It also provides for both rapid powered deployment of a hydrophone array and continuous tow in a preferred direction for the design life of the buoy. The directional capability affords a significant advantage in acoustic performance since the signal-to-noise can be controlled by pointing the array to a target to resolve directional ambiguities. The weight of the hydride motor also assists rapid deployment of the vertical signal cable since it is free-falling; and during towing of the surface float a low scope (slope) of the vertical cable is maintained. The linearity of the array can also be maintained since it does not depend on variable winds and currents thereby stabilizing the acoustic beam pattern of the array. The hydride motor converts the expanding jet steam directly into a mass thrust as well as a thrust component reacting against the high density water thereby significantly reducing the volume and complexity of the motor.

The radiating acoustic level from the motor can be controlled within a broad high frequency band for covert operation. The broad band noise is masked by ambient noise and can be selected so that it will not interfere with acoustic performance of the array.

It is understood that various changes in details, materials, steps and arrangements of parts, which have been herein described and illustrated in order to explain the nature of the invention, may be made by those skilled in the art within the principle and scope of the invention as expressed in the appended claims.

What is claimed is:

1. A hydrophone deployment system for an air-launched sonobuoy comprising, in combination:
- tow means including a metal hydride motor for providing a jet thrust in water;
- flotation means within said tow means and ejectable therefrom upon immersion in the water;
- cable means connected at one end to said flotation means and formed within said tow means to payout as said tow means descends to a selected depth in the water;
- hydrophone array means operatively connected to the other end of said cable means and formed within said tow means to payout as said tow means moves relative to said cable means at the selected depth; and
- control means connected to said tow means and responsive to a deployment event for initiating the thrust at the selected depth.

2. A hydrophone deployment system according to claim 1 wherein said motor further comprises:
- a metal hydride bed;
- an oxygen supply
- release means operatively connected to said bed, said supply, and responsive to said control means for releasing hydrogen and oxygen at a selected time after occurrence of the deployment event; and
- combustion means connected to receive the hydrogen and oxygen for igniting the mixture for providing the jet thrusts.

3. A hydrophone deployment system according to claim 2 wherein said release means further comprises:
- an electric heater within said bed responsive to said control means for heating said bed and releasing the hydrogen therein; and
- an oxygen value connected between said supply and said combustion means for regulating the flow of oxygen thereto.

4. A hydrophone deployment system according to claim 3 wherein said release means further comprises:
- a steam coil within said bed connected between high and low pressure regions of said combustion means for heating said bed and releasing the hydrogen therein; and
- a steam value connected between said combustion means and said bed for regulating the flow of steam therethrough.

5. A hydrophone deployment system according to claim 4 wherein said combustion means further comprises:
- a combustion chamber connected to receive and mix the hydrogen and oxygen from said bed and said supply;
- an ignitor within said chamber responsive to said control means for initiating a reaction of the hydrogen and oxygen; and
- a nozzle means connected to said chamber for forming the jet thrust.

6. A hydrophone deployment system according to claim 5 wherein said nozzle means further comprises:
- a movable nozzle connected to said chamber for changing the direction of the jet thrust;
- a servomotor drivingly connected to said nozzle; and
- compass means operatively connected to said servomotor for controlling the direction of the jet thrust.

7. A hydrophone deployment system according to claim 1 wherein said control means further comprises:
- a timer actuated upon air-launching of the sonobuoy for providing signals to said motor for initiating a jet thrust at the selected depth.

8. A hydrophone deployment system according to claim 1 wherein said array means further comprises:
- a sea anchor;
- electronic means fixedly secured within said tow means and operatively connected to said cable means; and
- a plurality of hydrophones connected by a signal cable and operatively connected between said sea anchor and said electronic means.

9. A hydrophone deployment system according to claim 1 wherein said array means further comprises:
- electronic means connected to the other end of said cable means and releasably deployable from said tow means;
- a sea anchor; and
- a plurality of hydrophones connected by a signal cable and operatively connected between said sea anchor and said electronic means.

10. A hydrophone deployment system according to claim 1 wherein said array means further comprises:
- a sea anchor deployable from said tow means and connected to the other end of said cable means;
- electronic means deployable from said tow means and connected to said sea anchor; and
- a plurality of hydrophones connected by a signal cable and operatively connected between said electronic means and said motor.

11. Apparatus for extending a horizontal line in a fluid medium comprising, in combination:

tow means including a metal hydride motor for providing a jet thrust in water;

flotation means within said tow means and ejectable therefrom upon immersion in the water;

first cable means connected at one end to said flotation means and formed within said tow means to payout as said tow means descends to a selected depth in the water;

second cable means operatively connected to the other end of said first cable means and formed within said tow means to payout as said tow means moves relative to said first cable means at the selected depth; and control means connected to said tow means and responsive to a deployment event for initiating the thrust at the selected depth.

12. Apparatus according to claim 11 wherein said motor further comprises:

a metal hydride bed;

an oxygen supply;

release means operatively connected to said bed, said supply, and responsive to said control means for releasing hydrogen and oxygen at a selected time after occurrence of the deployment event; and combustion means connected to receive the hydrogen and oxygen for igniting the mixture for providing the jet thrusts.

13. Apparatus according to claim 12 wherein said release means further comprises:

an electric heater within said bed responsive to said control means for heating said bed and releasing the hydrogen therein; and an oxygen valve connected between said supply and said combustion means for regulating the flow of oxygen thereto.

14. Apparatus according to claim 13 wherein said release means further comprises:

a steam coil within said bed connected between high and low pressure regions of said combustion means for heating said bed and releasing the hydrogen therein; and a steam valve connected between said combustion means and said bed for regulating the flow of steam therethrough.

15. Apparatus according to claim 14 wherein said combustion means further comprises:

a combustion chamber connected to receive and mix the hydrogen and oxygen from said bed and said supply;

an ignitor within said chamber responsive to said control means for initiating a reaction of the hydrogen and oxygen; and a nozzle means connected to said chamber for forming the jet thrust.

16. Apparatus according to claim 15 wherein said nozzle means further comprises:

a movable nozzle connected to said chamber for changing the direction of the jet thrust;

a servomotor drivingly connected to said nozzle; and compass means operatively connected to said servomotor for controlling the direction of the jet thrust.

17. Apparatus according to claim 11 wherein said control means further comprises:

a timer actuated upon launching for providing signals to said motor for initiating a jet thrust at the selected depth.

18. Apparatus according to claim 11 wherein said second cable means further comprises:

a sea anchor;

a cable operatively connected between said sea anchor and the other end of said first cable means.

19. Apparatus according to claim 11 wherein said second cable means further comprises:

a sea anchor operatively connected to the other end of said first cable means.

* * * * *